United States Patent
Lapidez (10) Patent No.: US 6,581,887 B2
(45) Date of Patent: Jun. 24, 2003

(54) ROTATABLE TELEVISION MOUNTING ASSEMBLY

(76) Inventor: Mark R Lapidez, 214 Williams Way South, Calverton, NY (US) 11933

( * ) Notice: Subject to any disclaimer, the term of this patent is extended or adjusted under 35 U.S.C. 154(b) by 0 days.

(21) Appl. No.: 09/992,402

(22) Filed: Nov. 19, 2001

(65) Prior Publication Data

US 2003/0094550 A1 May 22, 2003

(51) Int. Cl.$^7$ ............................................... A47G 35/00
(52) U.S. Cl. ........................ 248/122.1; 248/123.11; 248/183.1; 248/284.1; 248/447.2; 248/919; 248/924
(58) Field of Search ..................... 248/121, 122.1, 248/123.11, 124.1, 125.7, 125.9, 130, 278.1, 279.1, 183.1, 124.2, 284.1, 291.1, 919, 924; 211/26; 118/800, 883

(56) References Cited

U.S. PATENT DOCUMENTS

| | | | | |
|---|---|---|---|---|
| 1,025,349 A | * | 5/1912 | Weisberger | 211/170 |
| 1,216,321 A | * | 2/1917 | Inami | 248/447.2 |
| 1,876,319 A | * | 9/1932 | Smith | 248/122.1 |
| 2,598,529 A | * | 5/1952 | Fritz | 248/124.2 |
| 2,986,366 A | * | 5/1961 | Wesson | 211/87.01 |
| 3,662,981 A | * | 5/1972 | Hogrebe | 248/278.1 |
| 3,889,910 A | * | 6/1975 | Walters | 248/122.1 |
| 3,897,724 A | * | 8/1975 | McDonald | 100/34 |
| 4,118,002 A | * | 10/1978 | Bartlett | 15/321 |
| 4,166,602 A | * | 9/1979 | Nilsen et al. | 248/123.11 |
| 4,310,136 A | * | 1/1982 | Mooney | 248/183.1 |
| 4,660,791 A | * | 4/1987 | Lisak | 211/26 |
| 4,964,606 A | * | 10/1990 | Beam et al. | 248/188.5 |
| 5,253,832 A | * | 10/1993 | Bolas et al. | 248/123.11 |
| 5,400,993 A | * | 3/1995 | Hamilton | 248/279.1 |
| 5,738,316 A | * | 4/1998 | Sweere et al. | 248/123.11 |
| 5,797,568 A | * | 8/1998 | Canton Gongora et al. | 248/122.1 |
| 5,944,896 A | * | 8/1999 | Landesman et al. | 118/500 |

* cited by examiner

*Primary Examiner*—Ramon O. Ramirez
*Assistant Examiner*—Tan Le
(74) *Attorney, Agent, or Firm*—Michael I. Kroll (57) ABSTRACT

The present invention 10 discloses a device for rotatably holding a television therein having a base unit 32 that could be mounted to a wall 20, ceiling 18, table 16 or other such stable structure and a rotative mounting assembly 30 for retaining the television 14 therein. The base unit 32 comprises a base plate and a vertical support post 36 extending perpendicularly therefrom. The rotative mounting assembly 30 comprises two cross members 42, 43 that are connected by a central lap joint 24 to form an x-brace having four arms with each arm having a bracket member 42 extending from the distal end thereof. A pivoting bolt 22 assembly passes through recesses in the cross members at the lap joint 24 and through corresponding recesses in the vertical support post 36 of the base unit 32 thereby connecting the rotative mounting assembly thereto. The distal ends of each bracket member 42 have a threaded sleeve 52 passing therethrough into which a bolt is threaded 56 with the bolt having a round tension knob 46 on the exterior side and a rubber compression bumper 48 on the interior side. The cross members are telescopically extendable and retractable and are selectively maintained in position to accommodate television sets of various sizes by means of tension pin 44.

9 Claims, 16 Drawing Sheets

ROTATABLE TELEVISION MOUNTING ASSEMBLY

BACKGROUND OF THE INVENTION

1. Field of the Invention

The present invention relates generally to television mounting brackets, and more specifically, to a fully rotatable television mounting assembly that provides for the axial rotation in a windmill-like manner of a television as relative to the screen to allow a user to view the screen at an appropriate angle while watching television in a non-perpendicular position such as when lying on ones side. The present invention has a base unit that could be mounted to a wall, ceiling, table or other such stable structure and a rotative mounting assembly for maintaining the television. The base unit comprises a mounting plate and a vertical support post extending perpendicularly therefrom. The rotative mounting assembly comprises two cross members that are connected by a central lap joint to form an x-brace having four appendages with each appendage having a bracket member extending from the distal end thereof. A pivoting bolt assembly passes through recesses in the cross members at the lap joint and through corresponding recesses in the vertical support post of the base unit thereby connecting the rotative mounting assembly thereto. The distal ends of each bracket member have a threaded sleeve passing therethrough into which a bolt is threaded with said bolt having a round tension knob on the exterior side and a rubber compression bumper on the interior side. The cross members and bracket members are telescopically extendable and retractable and are selectively maintained in position to accommodate television sets of various sizes by means of tension pins. Once the cross members and bracket members are secured in position to receive a particular television the set may be placed therein. The user then turns the tension knob in the direction that threads the rubber compression bumpers towards the television until said television is firmly maintained therebetween. The user then turns the television clockwise or counterclockwise to an appropriate angle to correspond with his viewing angle. The present invention may also be used with computer monitors to change the orientation of the screen.

2. Description of the Prior Art

There are numerous television bracket devices, while these devices may be suitable for the purposes for which they were designed; they would not be as suitable for the purposes of the present invention as hereinafter described.

SUMMARY OF THE PRESENT INVENTION

The present invention discloses device for rotatably holding a television therein having a base unit that could be mounted to a wall, ceiling, table or other such stable structure and a rotative mounting assembly for retaining the television therein. The base unit comprises a base plate and a vertical support post extending perpendicularly therefrom. The rotative mounting assembly comprises two cross members that are connected by a central lap joint to form an x-brace having four arms with each arm having a bracket member extending from the distal end thereof. A pivoting bolt assembly passes through recesses in the cross members at the lap joint and through corresponding recesses in the vertical support post of the base unit thereby connecting the rotative mounting assembly thereto. The distal ends of each bracket member have a threaded sleeve passing therethrough into which a bolt is threaded with the bolt having a round tension knob on the exterior side and a rubber compression bumper on the interior side. The cross members and bracket members are telescopically extendable and retractable and are selectively maintained in position to accommodate television sets of various sizes by means of a tension pin.

A primary object of the present invention is to provide a rotatable television mounting assembly that allows the television screen to be rotated 360 degrees in a windmill-like manner.

An additional object of the present invention is to provide a rotatable television mounting assembly that will allow a viewer to adjust the orientation of a television screen according to the viewer's position such as when lying on his side.

A further object of the present invention is to provide a rotatable television mounting assembly having expandable bracket members that can be adjusted to accommodate television sets of various sizes.

A yet further object of the present invention is to provide a rotatable television mounting assembly that can have one model sized to accommodate televisions having screens ranging from 13–19 inches and a second model sized to accommodate screens ranging from 19–26 inches.

Another object of the present invention is to provide a rotatable television mounting assembly that can be mounted on a wall, ceiling, table or other suitable stable structure.

Still another object of the present invention is to provide a rotatable television mounting assembly having adjustable hand screws with round knobs threaded through sleeves that are installed through the expandable bracket to easily secure or remove the television from within the mounting assembly.

One more object of the present invention is to provide a rotatable television-mounting bracket that is simple and easy to use.

A further object of the present invention is to provide a rotatable television-mounting bracket that is economical in cost to manufacture.

Further objects of the present invention will appear as the description proceeds.

To the accomplishments of the above and related objects, this invention may be embodied in the form illustrated in the accompanying drawings, attention being called to the fact, however, that the drawings are illustrative only, and that changes may be made in the specific construction illustrated and described in the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMERALS

With regard to reference numerals used, the following numbering is used throughout the drawings.
10 present invention
12 user
14 television
16 television stand
18 ceiling
20 wall
22 pivot bolt
24 lap joint
26 cross member
28 cross member
30 rotative assembly
32 base unit
34 holes
36 vertical support post
38 washer
40 nut
42 extendable bracket
43 male expansion bracket
44 tension pin
46 tension knob
48 rubber bumper
50 plastic end cap
52 threaded sleeve
54 rubber cushion seat
56 threaded bolt
58 housing for tension pin
60 arrow
62 holding plate

DESCRIPTION OF THE PREFERRED EMBODIMENTS

The following discussion describes in detail one embodiment of the invention and several variations of that embodiment. This discussion should not be construed, however, as limiting the invention to those particular embodiments, practitioners skilled in the art will recognize numerous other embodiments as well. For definition of the complete scope of the invention, the reader is directed to appended claims.

Figure 1:
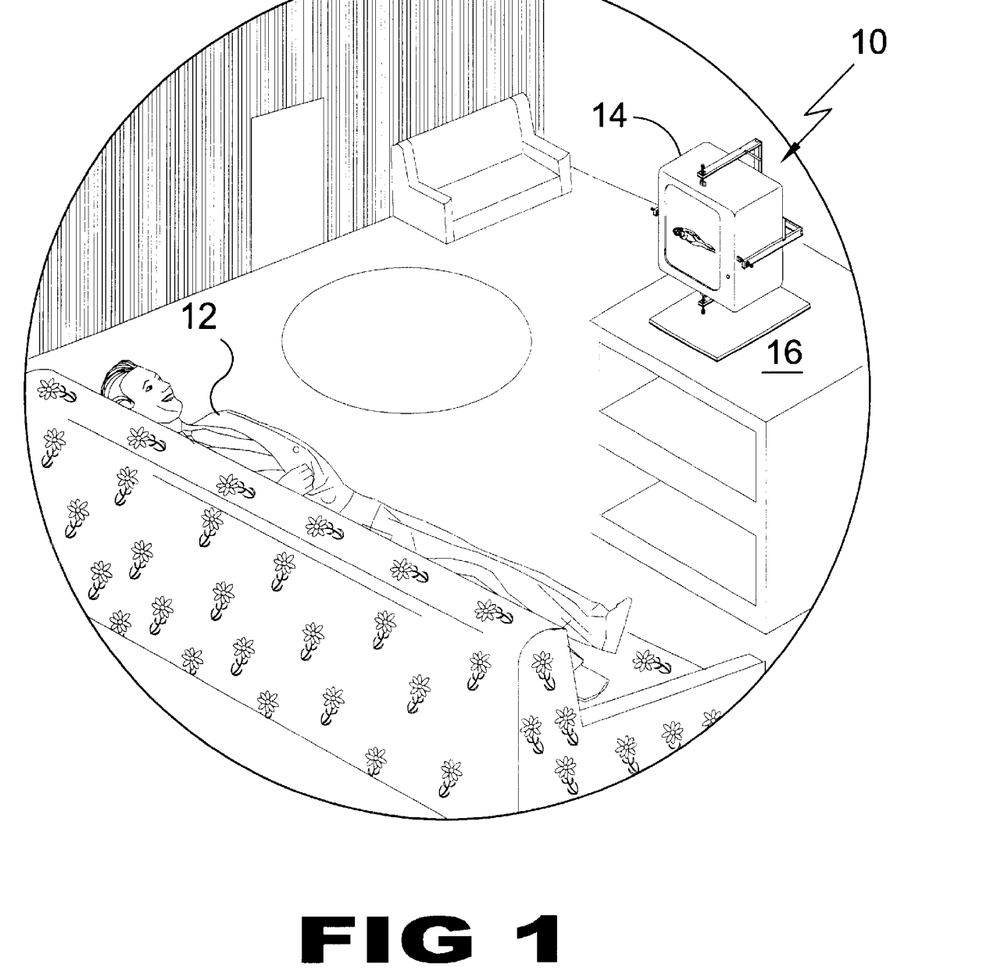
FIG. 1 is a perspective view of the present invention in use.

Turning to FIG. 1, shown therein is a perspective view of the present invention 10 in use showing a man 12 lying on his side while watching a television 14 that is oriented accordingly due to the present invention which is a vertical swinging television mounting assembly that is capable of swinging 360 degrees in a vertical windmill-like motion. The device 10 is mounted on a TV stand 16 and could also be mounted on the wall or the ceiling and is manually rotated to any angle for watching television while laying down in a substantially horizontal position.

Figure 2:
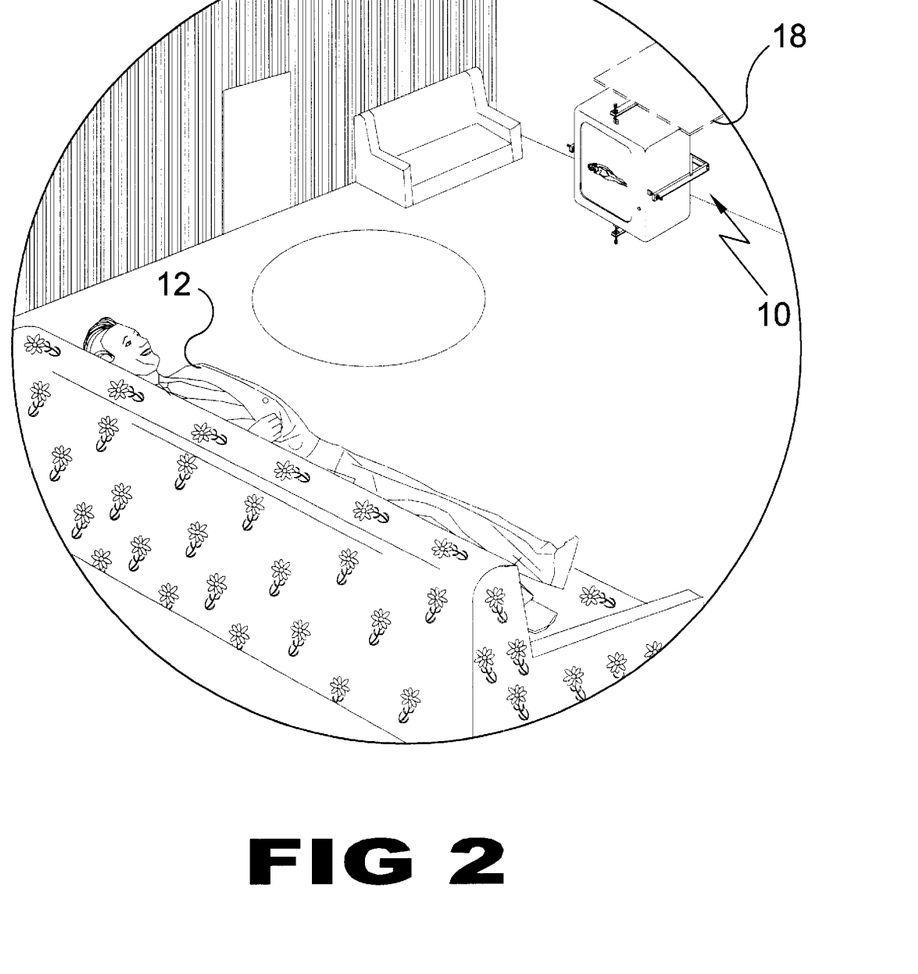
FIG. 2 is a perspective view of the present invention in use.

Turning to FIG. 2, shown therein is a perspective view of the present invention 10 in use showing a man 12 lying on his side while watching a television that is mounted on the ceiling 18 and could also be mounted on the wall or on a TV stand and is manually spun to any angle for watching television while laying down in a horizontal position.

Figure 3:
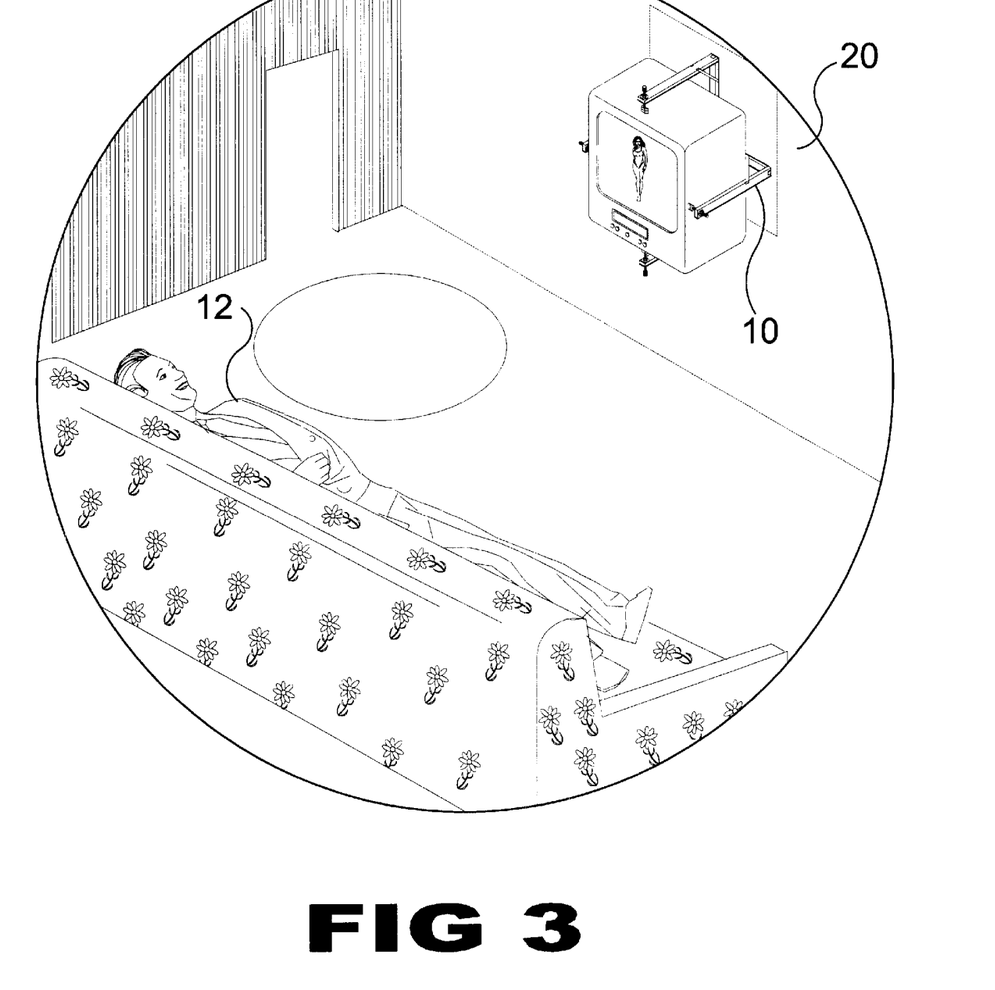
FIG. 3 is a perspective view of the present invention in use.

Turning to FIG. 3, shown therein is a perspective view of the present invention 10 in use showing a man 12 lying on his side while watching a television that is mounted on the wall 20 and could also be mounted on the ceiling or on a TV stand and is manually spun to any angle for watching television while laying down in a parallel or horizontal position.

Figure 4:
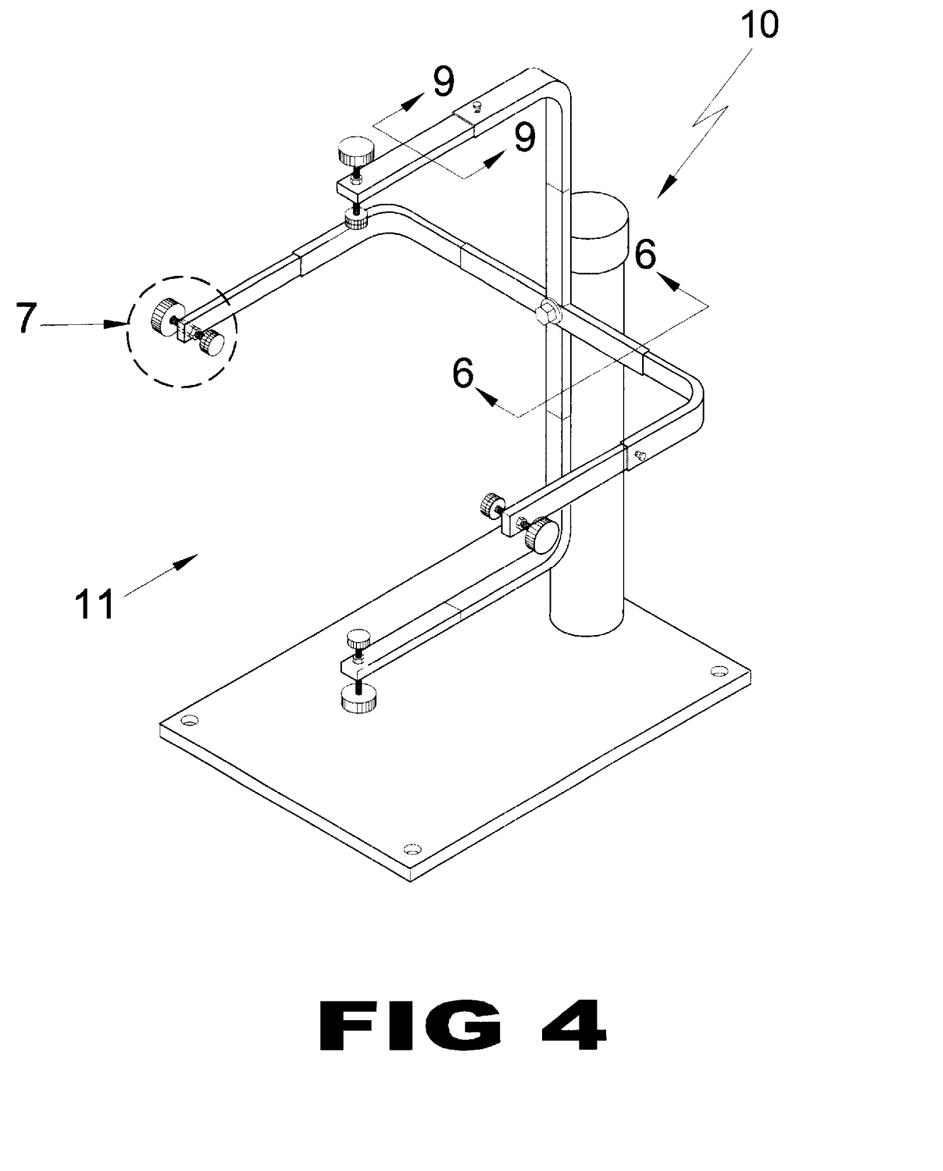
FIG. 4 is a perspective view of the present invention.

Turning to FIG. 4, shown therein is a perspective view of the first embodiment of the present invention 10 which is a vertical swinging television bracket assembly that is of a size sufficient to accommodate television sets having 13"–19" screens. The device is capable of swiveling 360 degrees in a vertical plane or windmill-like motion. The device mounts to either a wall, a TV stand, or the ceiling and is manually rotated to any angle for watching television while lying down in a horizontal position.

Figure 5:
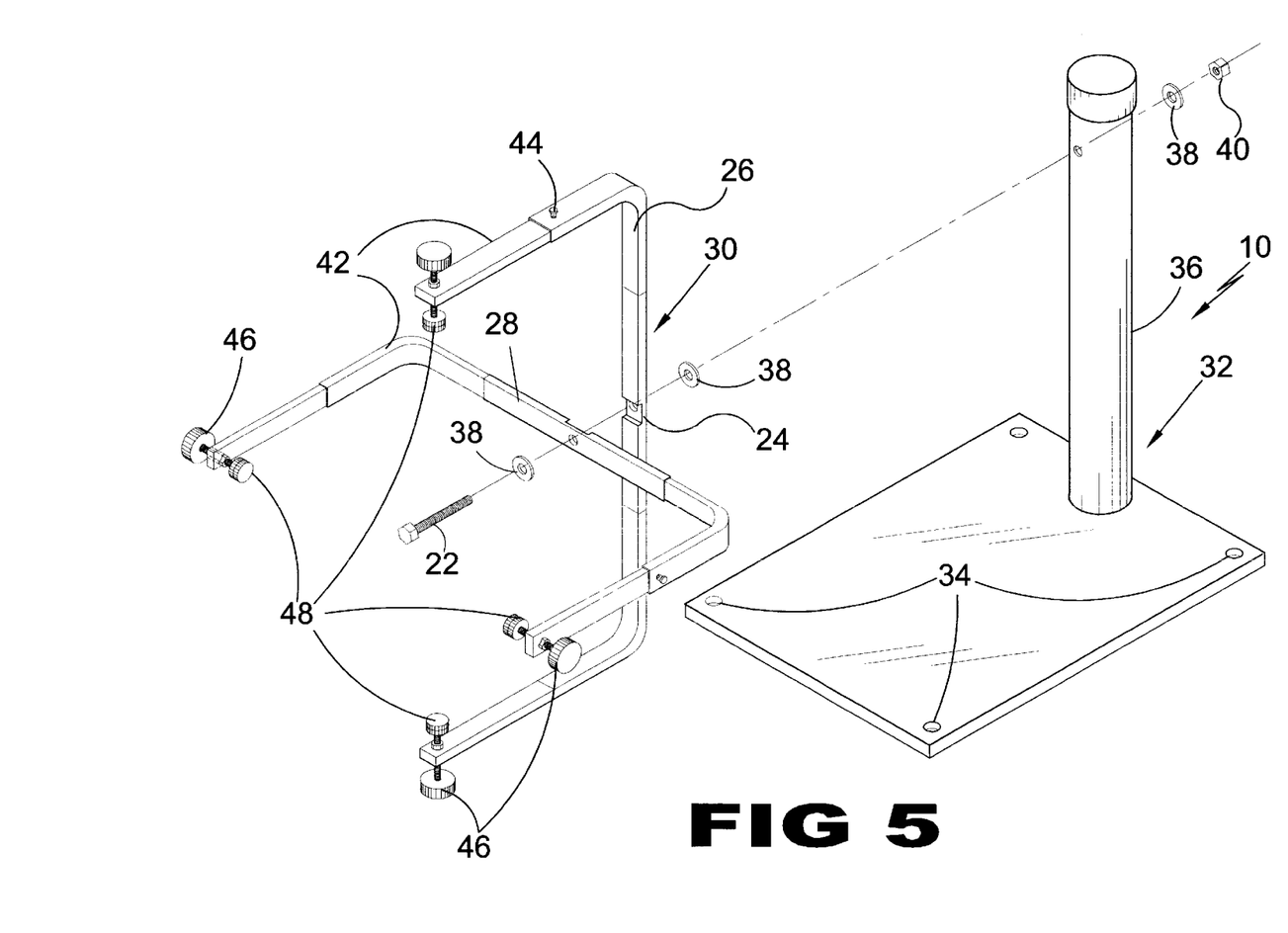
FIG. 5 is a partial exploded perspective view of the present invention.

Turning to FIG. 5, shown therein is a partial exploded perspective view of the first embodiment of the present invention 10 showing the rotative mounting assembly 30, including components of the pivoting bolt 22 assembly including the lap joint 24 configuration that locks the two U-shaped cross members 26, 28 together. Shown is base unit 32 having disposed therein the mounting holes 34 having a vertical upright standing post 36 disposed thereon upon which the rotating mounting equipment is attached using the pivoting bolt 22 having a plurality of washers 38 and nuts 40. The cross members 26, 28 have means of extending their length using expandable brackets 42 having tension pins 44 mounted thereon. Also shown are adjustable tension knobs 46 having rubber bumpers 48 mounted thereon so as to avoid scratching the television which is held therein. Mounting holes 34 are for receiving fastening means, e.g., threaded fasteners, as would be done in the standard manner by one skilled in the art.

Figure 6:
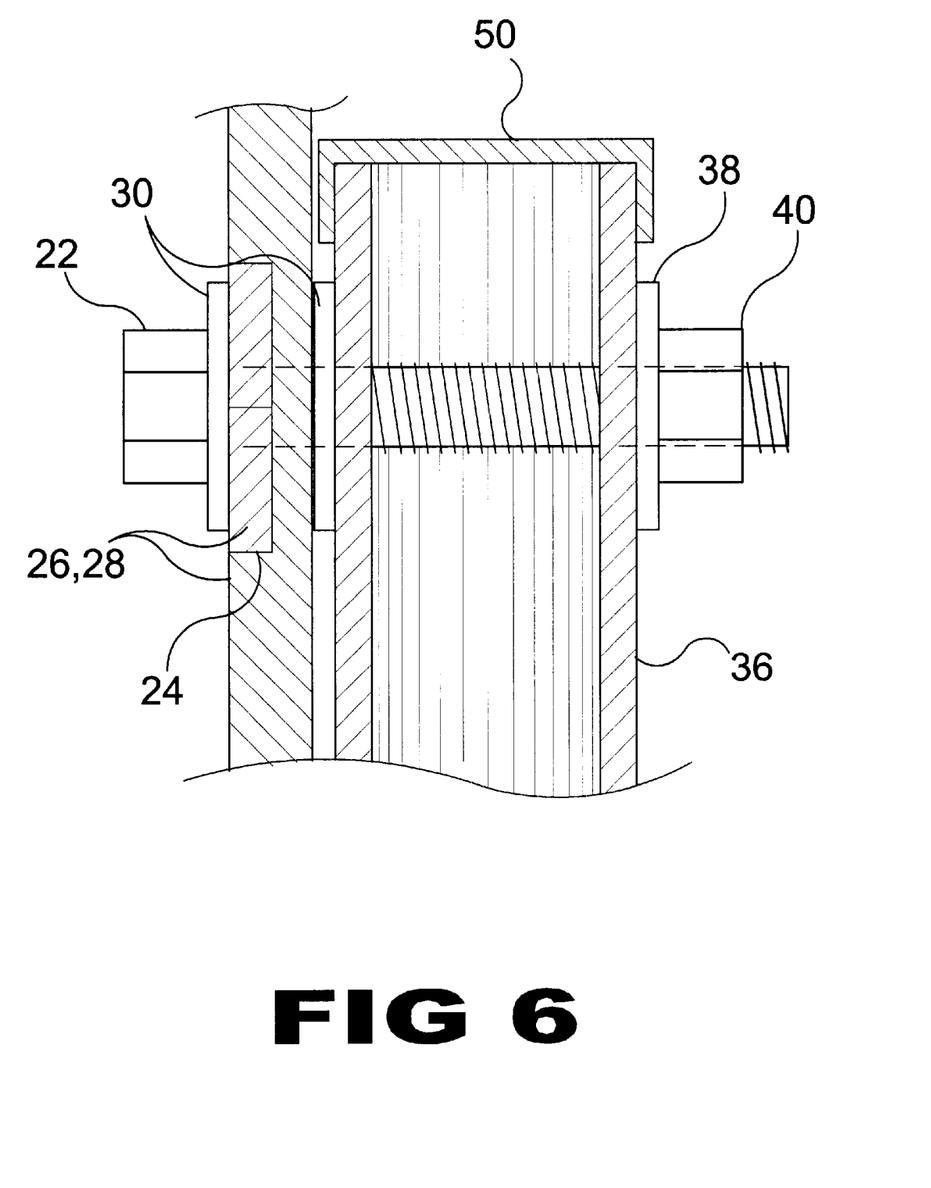
FIG. 6 is a cross-sectional side view of the pivot bolt assembly taken from FIG. 4 as indicated.

Turning to FIG. 6, shown therein is a cross-sectional side view of the pivoting bolt 22 mechanism of the present invention taken from FIG. 4 as indicated. Shown are the cross members 26, 28, the lap joint 24, nut 40, washers 38, a plastic end cap 50 and the support post 36 which could be made of three-inch steel pipe or the like.

Figure 7:
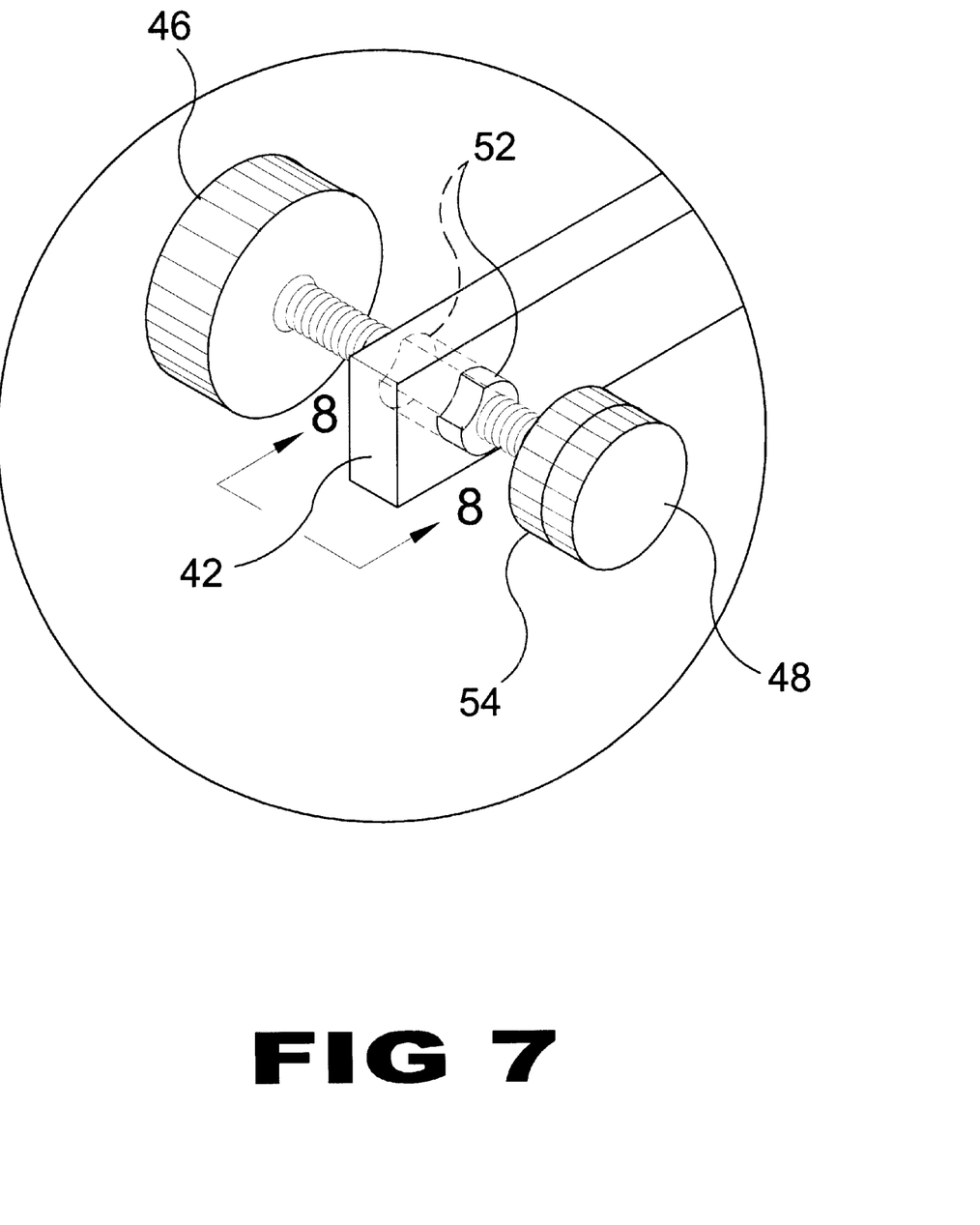
FIG. 7 is a detailed view of the tension knob mechanism taken from FIG. 4 as indicated.

Turning to FIG. 7, shown therein is a detailed view of the tension knob 46 mechanism of the first embodiment of the present invention taken from FIG. 4 as indicated showing the clamping device that holds the television within the pivoting cross members. The television is secured to or released from the bracket by turning the tension knob 46. Shown are the rubber cushions 48, the extendable bracket end 42, a threaded sleeve 52 and a rubber cushion seat 54.

Figure 8:
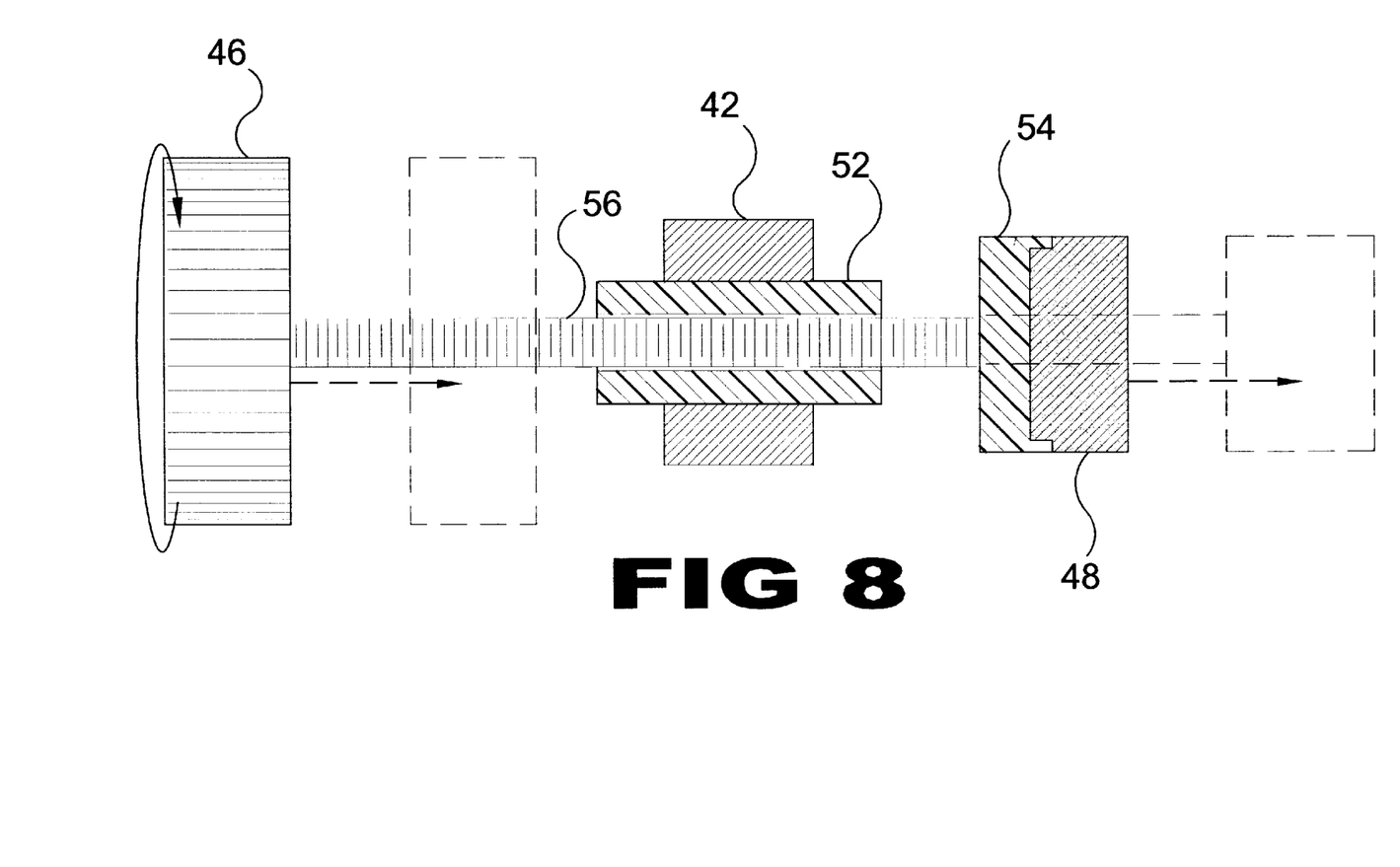
FIG. 8 is a cross-sectional view of the tension knob mechanism taken from FIG. 7 as indicated.

Turning to FIG. 8, shown therein is a partial cross-sectional view of the clamping device of the first embodiment of the present invention taken from FIG. 7 as indicated showing the tension knob 46 assembly with the threaded bolt portion 56 threaded into the threaded sleeve 52 that passes through the extendable bracket 42 along with the rubber cushion 48 and its seat 54.

Figure 9:
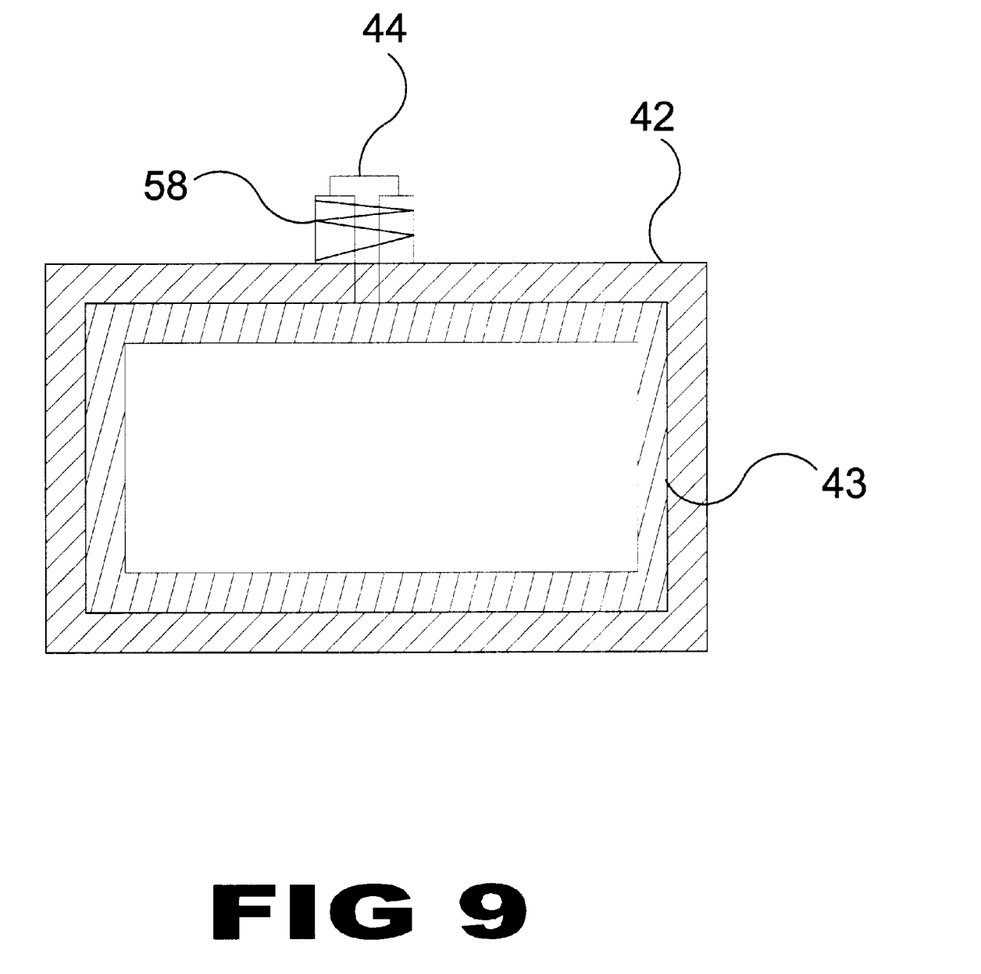
FIG. 9 is a cross-sectional view of the expandable bracket taken from FIG. 4 as indicated.

Turning to FIG. 9, shown therein is a cross-sectional view of the telescoping extendable bracket 42 with slidable male inner bracket 43 of the first embodiment of the present invention taken from FIG. 4 as indicated showing the tension pin 44 in the locked position inside its spring loaded housing 58 which secures the bracket 42.

Figure 10:
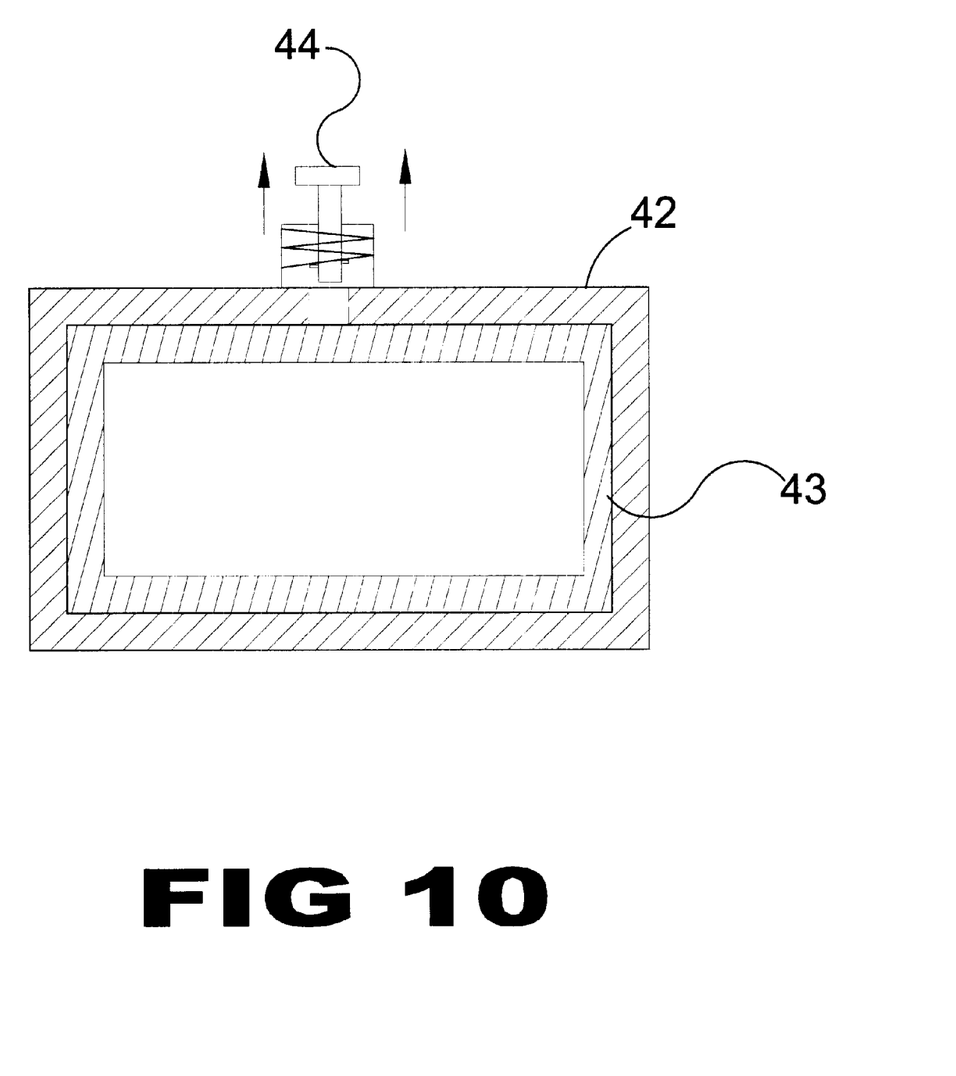
FIG. 10 is a cross-sectional view of the expandable bracket taken from FIG. 4 as indicated.

Turning to FIG. 10, shown therein is a cross-sectional view of the telescoping brackets 42, 43 of the first embodiment of the present invention taken from FIG. 4 as indicated showing the tension pin 44 in the unlocked position in its housing 58. To release the tension from the extendable bracket 43, the tension pin 44 is lifted and the extendable bracket 43 is manually moved to a desired position.

Figure 11:
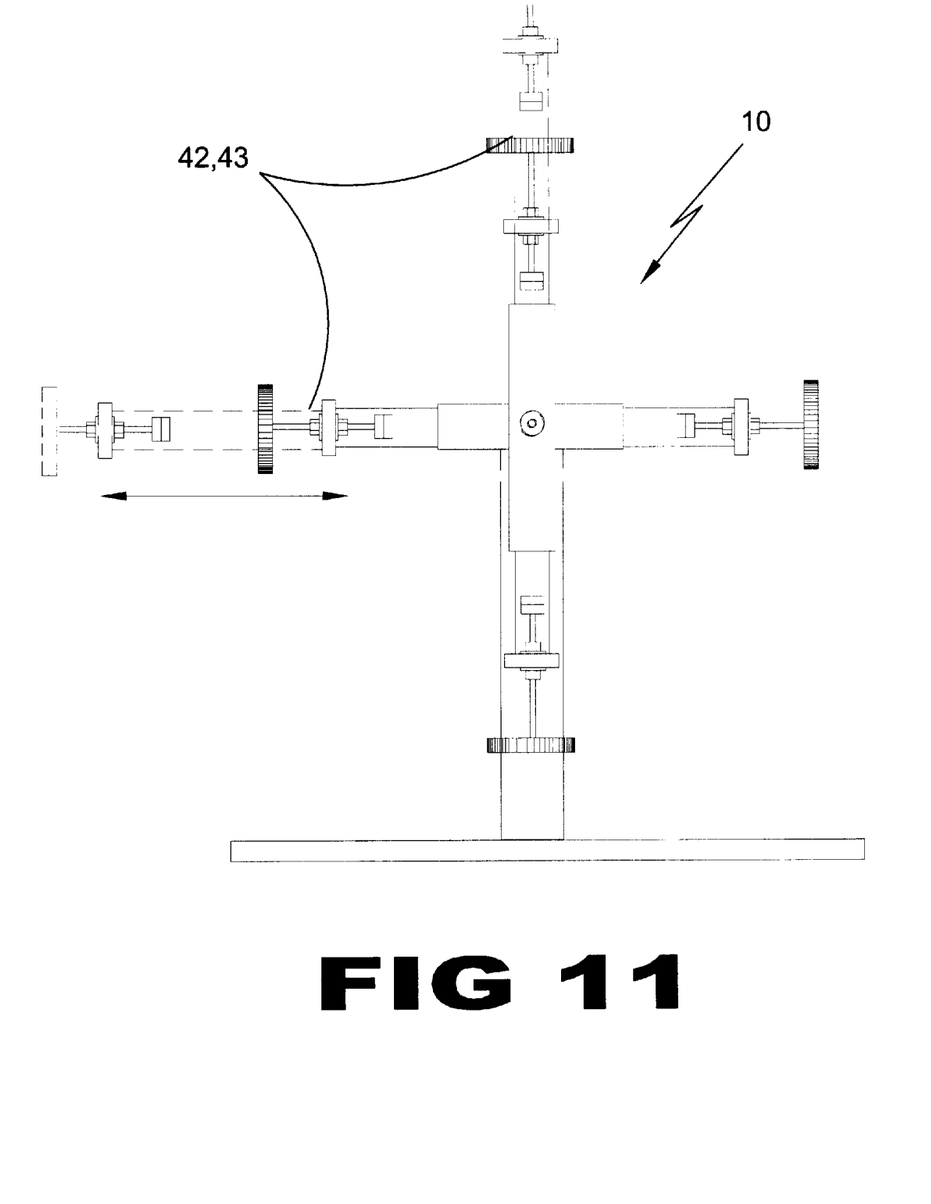
FIG. 11 is a front view of the present invention.

Turning to FIG. 11, shown therein is a front view of the first embodiment of the present invention 10 demonstrating how the brackets 42 can be extended to accommodate different sized television sets. They are adjusted by pulling up the tension pin 44 and manually adjusting the length of the bracket 42, 43 to a desired size or fit.

Figure 12:
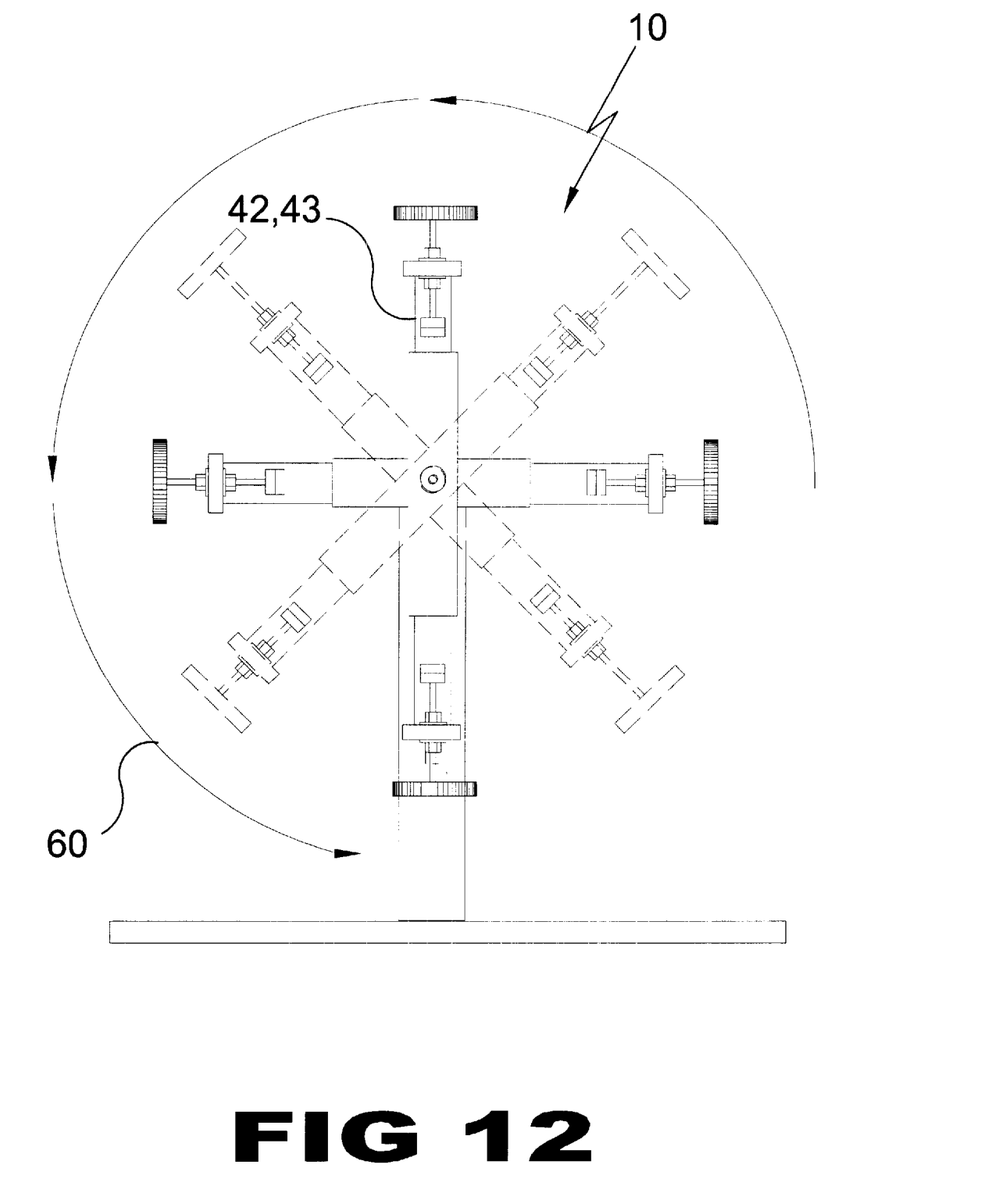
FIG. 12 is a front view of the present invention.

Turning to FIG. 12, shown therein is a front view of the first embodiment of the present invention 10 showing how the rotational bracket 42, 43 is capable of rotating 360 degrees (see arrow 60) with a television mounted within the bracket. The bracket 42, 43 is manually turned to the desired position.

Figure 13:
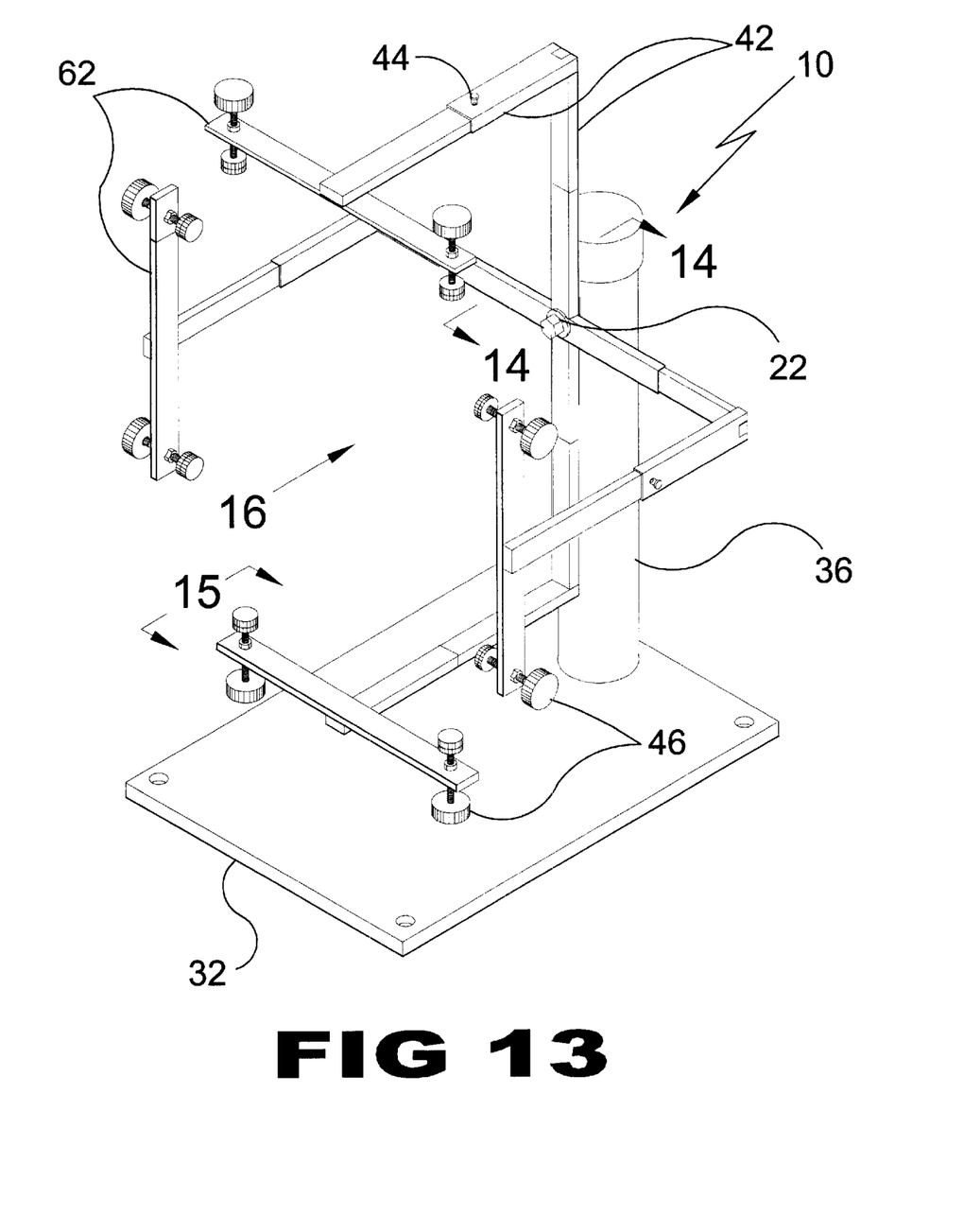
FIG. 13 is a perspective view of a second embodiment of the present invention.

Turning to FIG. 13, shown therein is a perspective view of the second embodiment of the present invention 10 adapted to receive larger 19"–26" television sets by increasing the stability by adding an elongated holding plate 62 having a plurality of tension knobs 46. Plate 62 is mounted perpendicular to arm 42. Other elements previously disclosed are also shown.

Figure 14:
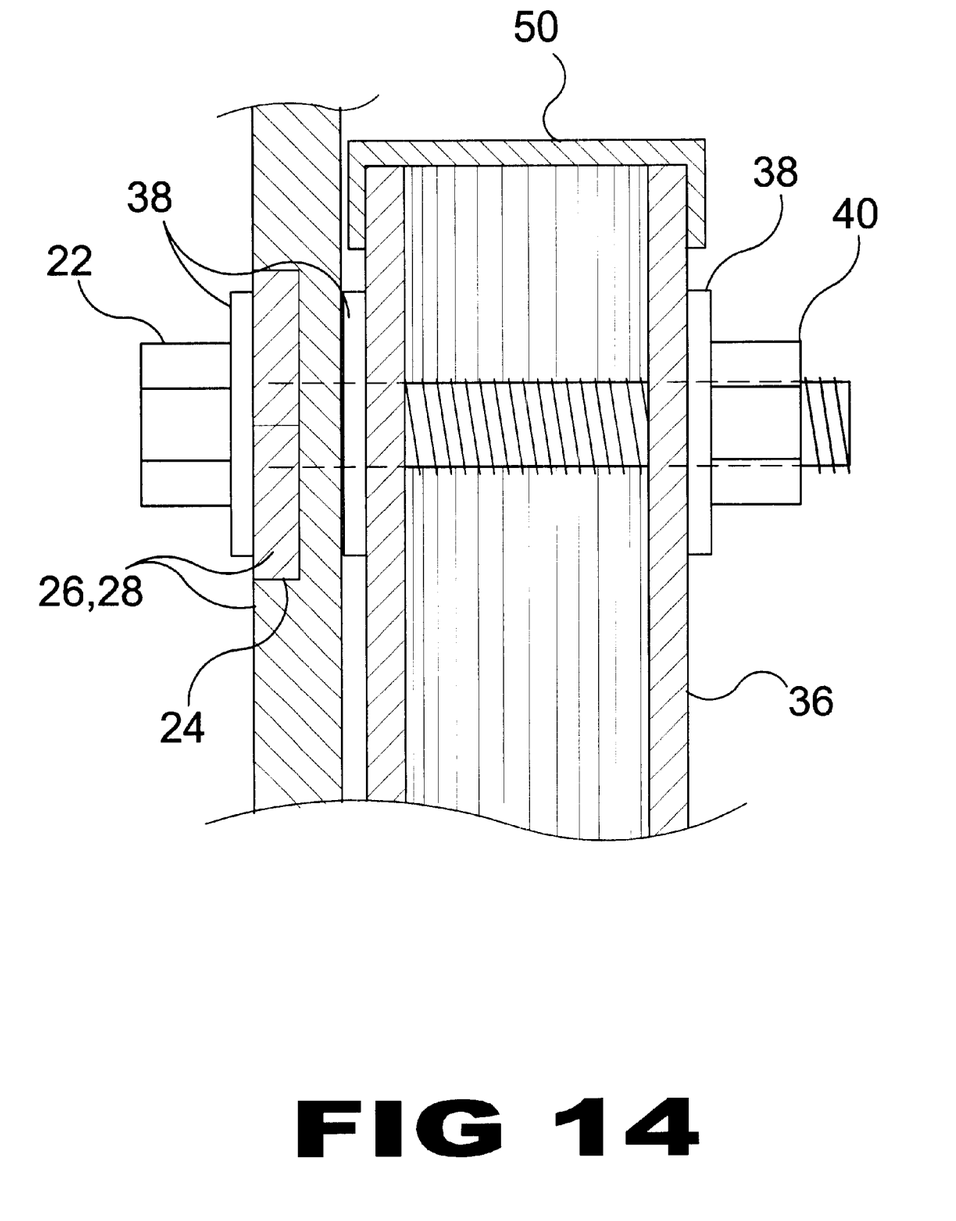
FIG. 14 is a cross-sectional side view of the pivot bolt mechanism of the second embodiment of the present invention taken from FIG. 13 as indicated.

Turning to FIG. 14, shown therein is a cross-sectional side view of the pivoting bolt 22 assembly of the second embodiment of the present invention taken from FIG. 13 as indicated. Other elements previously disclosed are also shown.

Figure 15:
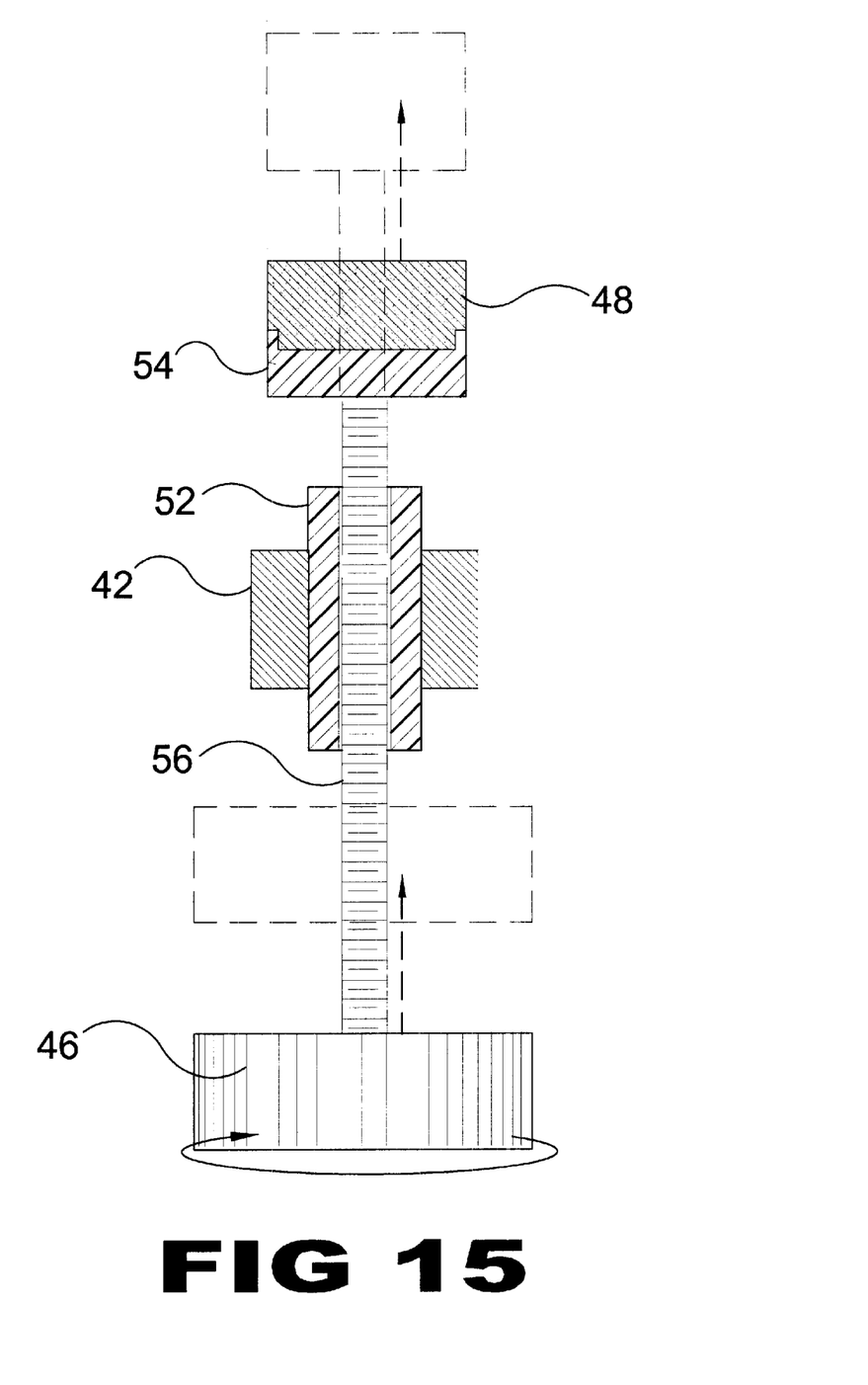
FIG. 15 is a cross-sectional view of the tension knob mechanism of the second embodiment of the present invention taken from FIG. 13 as indicated.

Turning to FIG. 15, shown therein is a cross-sectional side view of clamping device of the second embodiment of the present invention showing the tension knob 46 assembly which is turned to assert or release pressure upon the television. Other elements previously disclosed are also shown.

Figure 16:
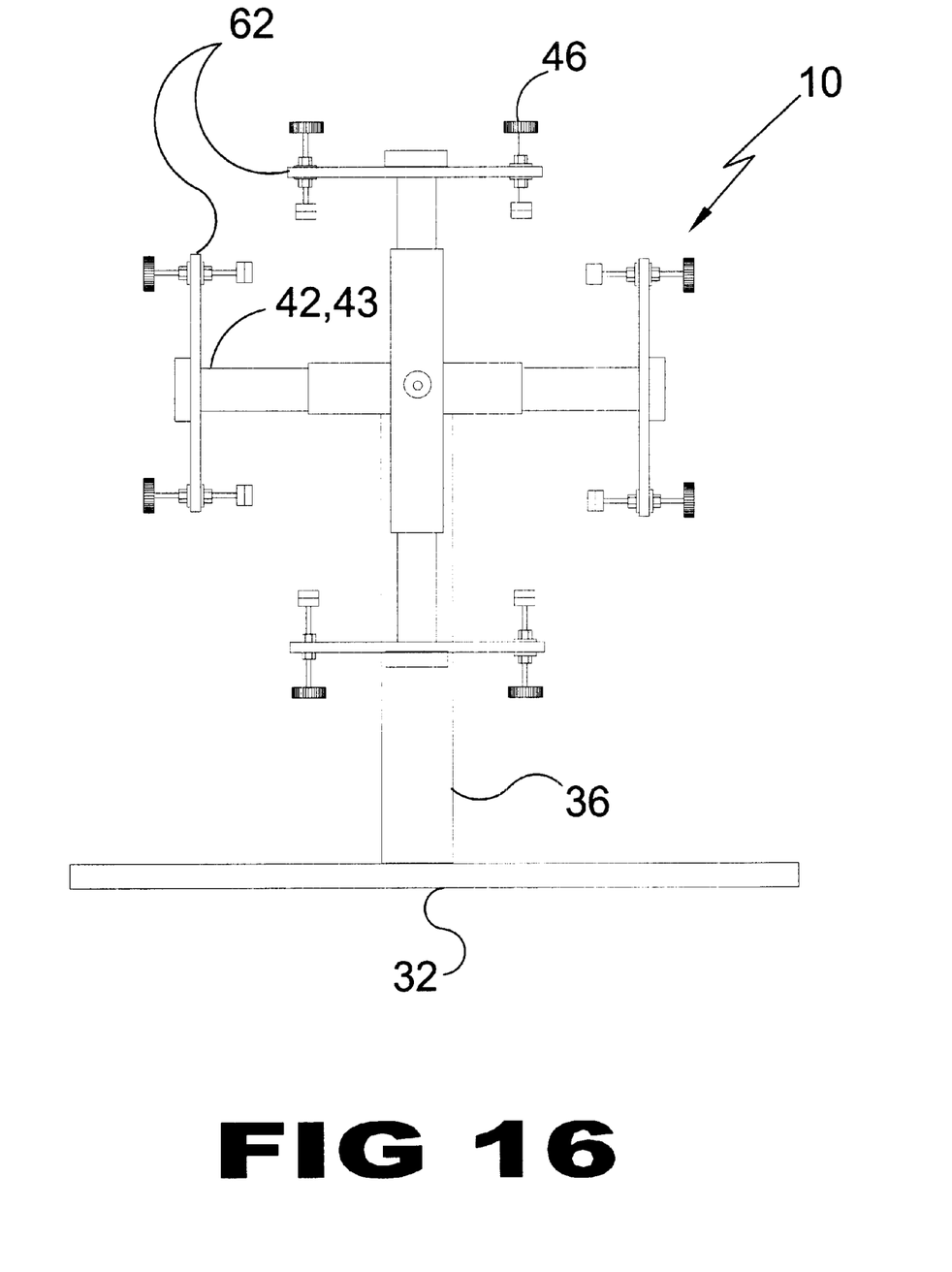
FIG. 16 is a front view of the second embodiment of the present invention.

Turning to FIG. 16, shown therein is a front view of the second embodiment of the present invention 10 wherein holding plates 62 allow each bracket member 42, 43 to have a plurality of tension knob 46 assemblies thereon thereby increasing the stability when maintaining larger television sets. Other elements previously disclosed are also shown.

What is claimed to be new and desired to be protected by letters patent is set forth in the appended claims:

I claim:

1. An apparatus for rotatably holding a television therein, comprising:
    a) a base adapted to be attached to an upwardly extending flat surface and a downwardly facing ceiling surface, said base having a plurality of holes disposed therein, said holes for receiving fastening means for attachment to said surface;
    b) a support post disposed on and perpendicular to said base upon which is mounted a rotative assembly;
    c) said rotative assembly comprising a pair of U-shaped cross members joined together by a lap joint at centers of bases of said cross members so that the bases of said cross members are fixed at right angles to each other;
    d) a pivot bolt passing through said lap joint joined to said support post to allow said pair of U-shaped cross members to rotate over 360 degrees in a plane parallel to said support post; and
    e) means adjacent to distal ends of said U-shaped cross members for engaging the sides of and supporting a television.

2. The apparatus of claim 1, wherein said pivot bolt is threaded and has a mating threaded fastener disposed thereon for attachment to said support post.

3. The apparatus of claim 2, wherein the distal ends of said U-shaped cross members have extensions disposed thereon whereby the ends of said cross-members can be fixedly extended.

4. The apparatus of claim 3, wherein said extensions have telescoping male and female portions for adjusting to the size of a television to be supported.

5. The apparatus of claim 4, wherein each of said extensions further comprises a spring-loaded tension pin disposed through male and female portions of a cross member, further said tension pin being disposed in a housing so that said tension pin is slidably disposed therein.

6. The apparatus of claim 5, wherein said television is disposed on male ends of said cross members.

7. The apparatus of claim 6, wherein each male end of a cross member has a threaded tension knob on one end thereof, said knob having a rubber bumper disposed on a second end thereof, said rubber bumper for contacting the television.

8. The apparatus of claim 7, further comprising a mating threaded sleeve disposed in the end of each male cross member for receiving said threaded tension knob.

9. The apparatus of claim 8, further comprising an elongated holding plate disposed on the end of each cross member, said holding plate having a plurality of means for attaching to a television, said holding plate being disposed generally perpendicular to the ends of said cross members so that the television is rotatably held therein.

* * * * *